United States Patent
Aratani et al.

(10) Patent No.: US 6,985,429 B2
(45) Date of Patent: Jan. 10, 2006

(54) OPTICAL RECORDING MEDIUM

(75) Inventors: Katsuhisa Aratani, Tokyo (JP); Shintaro Tanaka, Tokyo (JP); Naoki Okawa, Tokyo (JP)

(73) Assignee: Sony Corporation, Tokyo (JP)

( * ) Notice: Subject to any disclaimer, the term of this patent is extended or adjusted under 35 U.S.C. 154(b) by 319 days.

(21) Appl. No.: 10/220,207

(22) PCT Filed: Dec. 26, 2001

(86) PCT No.: PCT/JP01/11495

§ 371 (c)(1),
(2), (4) Date: Dec. 10, 2002

(87) PCT Pub. No.: WO02/054396

PCT Pub. Date: Jul. 11, 2002

(65) Prior Publication Data

US 2003/0137924 A1 Jul. 24, 2003

(30) Foreign Application Priority Data

Dec. 28, 2000 (JP) ........................... 2000-402146

(51) Int. Cl.
*G11B 3/70* (2006.01)

(52) U.S. Cl. ..................................................... 369/288
(58) Field of Classification Search ................ 369/288, 369/286, 283, 275.2; 428/64.1, 64.4, 457; 430/270.12, 270.11
See application file for complete search history.

(56) References Cited

U.S. PATENT DOCUMENTS 4,709,363 A  11/1987  Dirks et al.
5,673,251 A  * 9/1997  Suzuki et al. ............. 369/275.4
6,228,457 B1  5/2001  Ueno et al.
6,451,402 B1  * 9/2002  Nee ............................ 428/64.1
6,764,735 B2  * 7/2004  Nee ............................ 428/64.1
6,790,503 B2  * 9/2004  Nee ............................ 428/64.1

FOREIGN PATENT DOCUMENTS

| EP | 0064777 | 11/1982 |
|---|---|---|
| JP | 57186244 | 11/1982 |
| JP | 6208732 | 7/1994 |
| JP | 10177742 | 6/1998 |
| JP | 2000228032 | 8/2000 |
| JP | 2000285517 | 10/2000 |
| JP | 200215464 | 1/2002 |
| JP | 200292959 | 3/2002 |
| NL | 8102283 | 12/1982 |

\* cited by examiner

*Primary Examiner*—Angel Castro
(74) *Attorney, Agent, or Firm*—Sonneschein, Nath & Rosenthal LLP

(57) ABSTRACT

According to the present invention, there is provided an optical recording medium including at least an information recording layer and a reflective film in which the reflective film is comprised of an AgCu alloy thin film containing Cu the content of which is greater than or equal to 3.0 [atomic %] and less than or equal to 6.5 [atomic %]. Thus, the optical recording medium can be made inexpensive and weather resistance of the optical recording medium can be improved, thereby making it possible to avoid characteristics of the optical recording medium from being deteriorated even after it has been stored for a long time.

5 Claims, 13 Drawing Sheets

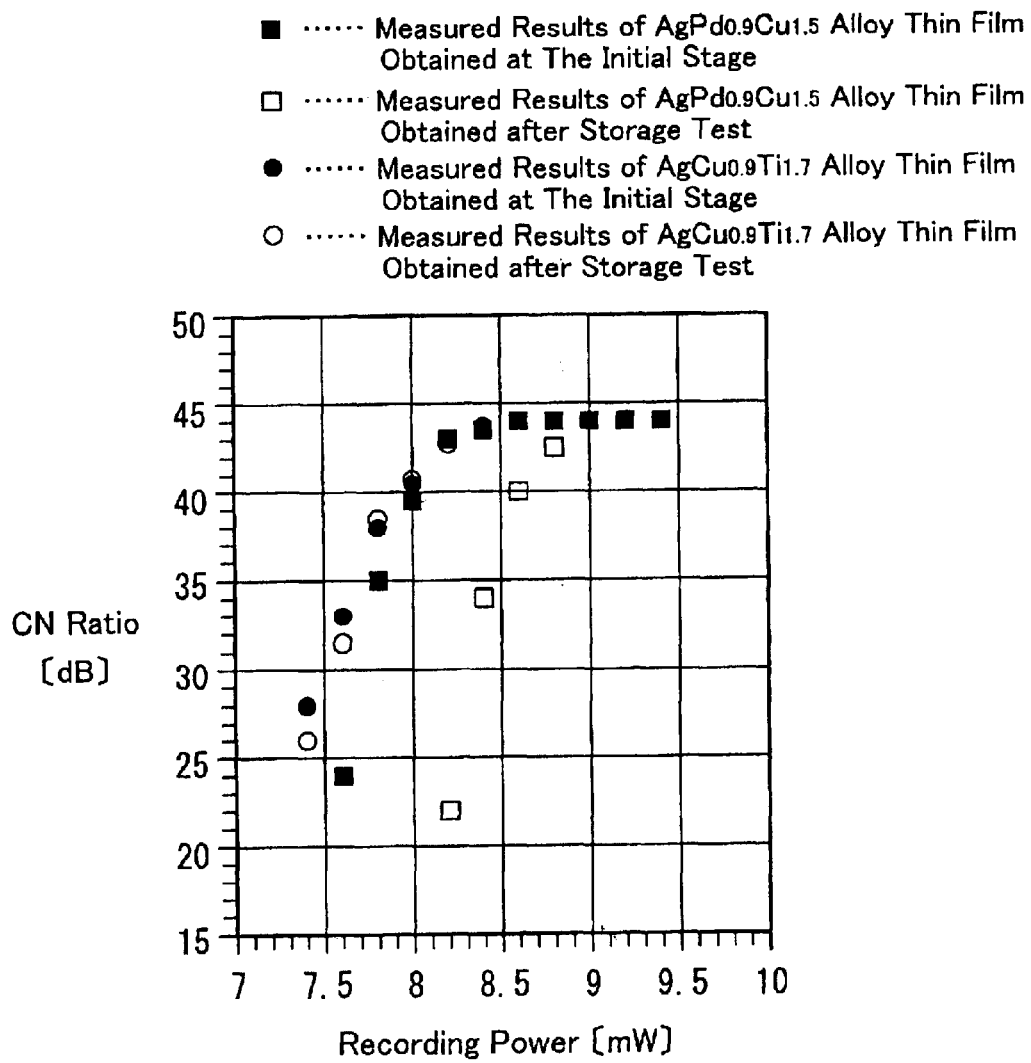

FIG. 6

(Table 1-1)

| Sample No. | Composition of Film-Forming Material (Numerical Value Represents Atomic %) | Total Amount of Al,Ti,Fe,Ni,Mo,W [Atomic %] | Structure of Optical Disc |
|---|---|---|---|
| Sample 1 | AgCu3.0 | — | Single Plate |
| Sample 2 | AgCu6.5 | — | Single Plate |
| Sample 3 (Inventive Example 1) | AgCu3.0 | — | Laminating Plate |
| Sample 4 (Comparative Example 1) | AgCu2.0 | — | Single Plate |
| Sample 5 (Comparative Example 2) | AgCu7.0 | — | Single Plate |
| Sample 6 (Comparative Example 3) | AgCu9.0 | — | Single Plate |
| Sample 7 (Comparative Example 4) | Si | — | Laminating Plate |
| Sample 8 (Comparative Example 5) | Ag | — | Single Plate |

FIG. 7

| Sample No. | Reflectance Obtained at The Initial Stage R1[%] | Reflectance Obtained at The Initial Stage R2[%] | Reflectance Obtained after Storage Test R3[%] | Reflectance Obtained after Storage Test R4[%] | Amount in Which Reflectance Was Changed before And after Storage Test \|R1 − R3\| [%] | Jitter Obtained at The Initial Stage [%] | Jitter Obtained after Storage Test [%] |
|---|---|---|---|---|---|---|---|
| Sample 1 | 21.4 | — | 22.0 | — | 0.6 | 6.5 | 6.5 |
| Sample 2 | 23.5 | — | 24.3 | — | 0.8 | 6.6 | 6.7 |
| Sample 3 (Inventive Example 1) | 25.2 | 24.8 | 26.2 | 24.7 | 1.0 | 6.5 | 7.4 |
| Sample 4 (Comparative Example 1) | 20.2 | — | 21.5 | — | 1.3 | 6.5 | 7.4 |
| Sample 5 (Comparative Example 2) | 24.4 | — | 26.6 | — | 2.2 | 6.7 | 6.4 |
| Sample 6 (Comparative Example 3) | 22.5 | — | 23.8 | — | 1.3 | 6.5 | 7.0 |
| Sample 7 (Comparative Example 4) | 20.7 | 19.6 | 19.5 | 21.3 | 1.2 | 6.6 | 6.6 |
| Sample 8 (Comparative Example 5) | 29.4 | — | 30.2 | — | 0.8 | 7.4 | >15 |

(Table 1-2)

FIG. 8

| Sample No. | Composition of Film-Forming Material (Numerical Value Represents Atomic %) | Total Amount of Al,Ti,Fe,Ni,Mo,W [Atomic %] | Structure of Optical Disc |
|---|---|---|---|
| Sample 9 | AgCu2.0Al4.0 | 4.0 | Single Plate |
| Sample 10 | AgCu4.2Al4.0 | 4.0 | Single Plate |
| Sample 11 | AgCu4.0Al7.1 | 7.1 | Single Plate |
| Sample 12 | AgCu9.0Ti1.7 | 1.7 | Single Plate |
| Sample 13 | AgCu9.0Ti4.6 | 4.6 | Single Plate |
| Sample 14 | AgCu3.7Fe0.5 | 0.5 | Single Plate |
| Sample 15 | AgCu3.7Fe1.5 | 1.5 | Single Plate |
| Sample 16 | AgCu3.7Fe2.6 | 2.6 | Single Plate |
| Sample 17 | AgCu3.7Fe4.2 | 4.2 | Single Plate |
| Sample 18 | AgCu7.3Fe2.5 | 2.5 | Single Plate |
| Sample 19 | AgCu7.3Fe4.1 | 4.1 | Single Plate |
| Sample 20 | AgCu3.2Al4.0Ti1.7 | 5.7 | Single Plate |
| Sample 21 | AgCu4.1Al3.9Ti1.7 | 5.6 | Single Plate |
| Sample 22 | AgCu3.0Al2.2Fe2.8 | 5.0 | Single Plate |
| Sample 23 | AgCu3.1Al5.3Fe2.8 | 8.1 | Single Plate |
| Sample 24 | AgCu4.0Ni2.3 | 2.3 | Single Plate |
| Sample 25 | AgCu8.2Ni4.2 | 4.2 | Single Plate |

(Table 2-1)

FIG. 9

| Sample No. | Reflectance Obtained at The Initial Stage R1[%] | Reflectance Obtained at The Initial Stage R2[%] | Reflectance Obtained after Storage Test R3[%] | Reflectance Obtained after Storage Test R4[%] | Amount in Which Reflectance Was Changed before And after Storage Test \|R1 − R3\| [%] | Jitter Obtained at The Initial Stage [%] | Jitter Obtained after Storage Test [%] |
|---|---|---|---|---|---|---|---|
| Sample 9  | 22.2 | — | 23.1 | — | 0.9 | 6.6 | 7.1 |
| Sample 10 | 20.3 | — | 20.9 | — | 0.6 | 6.7 | 6.7 |
| Sample 11 | 22.1 | — | 22.6 | — | 0.5 | 6.7 | 7.5 |
| Sample 12 | 19.8 | — | 20.2 | — | 0.4 | 6.5 | 6.5 |
| Sample 13 | 20.2 | — | 19.5 | — | 0.7 | 6.5 | 6.9 |
| Sample 14 | 22.5 | — | 23.3 | — | 0.8 | 6.6 | 6.7 |
| Sample 15 | 20.7 | — | 20.9 | — | 0.2 | 6.5 | 6.7 |
| Sample 16 | 21.4 | — | 21.9 | — | 0.5 | 6.5 | 6.5 |
| Sample 17 | 22.2 | — | 21.3 | — | 0.9 | 6.5 | 6.5 |
| Sample 18 | 23.1 | — | 23.1 | — | 0.0 | 6.5 | 6.4 |
| Sample 19 | 24.1 | — | 23.3 | — | 0.8 | 6.6 | 6.5 |
| Sample 20 | 17.2 | — | 17.2 | — | 0.0 | 6.5 | 6.5 |
| Sample 21 | 18.0 | — | 17.2 | — | 0.8 | 6.6 | 6.6 |
| Sample 22 | 23.6 | — | 22.8 | — | 0.8 | 6.5 | 6.6 |
| Sample 23 | 22.5 | — | 22.5 | — | 0.0 | 6.5 | 6.5 |
| Sample 24 | 21.4 | — | 21.8 | — | 0.4 | 6.6 | 6.8 |
| Sample 25 | 20.5 | — | 20.0 | — | 0.5 | 6.7 | 6.7 |

(Table 2-2)

FIG. 10

| Sample No. | Composition of Film-Forming Material (Numerical Value Represents Atomic %) | Total Amount of Al,Ti,Fe,Ni,Mo,W [Atomic %] | Structure of Optical Disc |
|---|---|---|---|
| Sample 26 | AgCu5.0Mo1.5 | 1.5 | Single Plate |
| Sample 27 | AgCu7.5Mo2.5 | 2.5 | Single Plate |
| Sample 28 | AgCu3.0W1.2 | 1.2 | Single Plate |
| Sample 29 | AgCu3.1W2.8 | 2.8 | Single Plate |
| Sample 30 | AgCu7.5W1.1 | 1.1 | Single Plate |
| Sample 31 | AgCu7.5W2.7 | 2.7 | Single Plate |
| Sample 32 (Inventive Example 2) | AgCu4.2Al4.0 | 4.0 | Laminating Plate |
| Sample 33 (Inventive Example 3) | AgCu4.0Ti1.7 | 1.7 | Laminating Plate |
| Sample 34 (Inventive Example 4) | AgCu3.7Fe4.2 | 4.2 | Laminating Plate |
| Sample 35 (Inventive Example 5) | AgCu7.3Fe2.5 | 2.5 | Laminating Plate |
| Sample 36 (Inventive Example 6) | AgCu4.0Ni2.3 | 2.3 | Laminating Plate |
| Sample 37 (Inventive Example 7) | AgCu7.0Mo1.5 | 1.5 | Laminating Plate |
| Sample 38 (Inventive Example 8) | AgCu8.1W2.5 | 2.5 | Laminating Plate |
| Sample 39 (Comparative Example 6) | AgCu5.4Al3.9Ti4.6 | 8.5 | Single Plate |

(Table 3-1)

FIG. 11

| Sample No. | Reflectance Obtained at The Initial Stage R1[%] | Reflectance Obtained at The Initial Stage R2[%] | Reflectance Obtained after Storage Test R3[%] | Reflectance Obtained after Storage Test R4[%] | Amount in Which Reflectance Was Changed before And after Storage Test \|R1 − R3\| [%] | Jitter Obtained at The Initial Stage [%] | Jitter Obtained after Storage Test [%] |
|---|---|---|---|---|---|---|---|
| Sample 26 | 21.2 | — | 20.9 | — | 0.3 | 6.6 | 6.8 |
| Sample 27 | 19.5 | — | 18.7 | — | 0.8 | 6.7 | 6.8 |
| Sample 28 | 20.7 | — | 20.1 | — | 0.6 | 6.7 | 6.8 |
| Sample 29 | 20.5 | — | 20.0 | — | 0.5 | 6.6 | 6.9 |
| Sample 30 | 20.9 | — | 20.5 | — | 0.4 | 6.6 | 6.7 |
| Sample 31 | 20.7 | — | 20.1 | — | 0.6 | 6.6 | 6.7 |
| Sample 32 (Inventive Example 2) | 22.5 | 23.0 | 21.9 | 22.8 | 0.6 | 6.7 | 6.9 |
| Sample 33 (Inventive Example 3) | 22.5 | 21.8 | 22.0 | 22.5 | 0.5 | 6.6 | 6.8 |
| Sample 34 (Inventive Example 4) | 22.1 | 21.3 | 22.4 | 22.3 | 0.3 | 6.5 | 6.7 |
| Sample 35 (Inventive Example 5) | 22.4 | 23.3 | 23.1 | 23.9 | 0.7 | 6.5 | 6.7 |
| Sample 36 (Inventive Example 6) | 21.5 | 20.7 | 21.0 | 20.9 | 0.5 | 6.4 | 6.6 |
| Sample 37 (Inventive Example 7) | 20.6 | 19.6 | 20.4 | 20.5 | 0.2 | 6.5 | 6.7 |
| Sample 38 (Inventive Example 8) | 21.0 | 20.2 | 20.6 | 20.9 | 0.4 | 6.4 | 6.5 |
| Sample 39 (Comparative Example 6) | 20.8 | — | 19.5 | — | 1.3 | 6.5 | 6.6 |

(Table 3-2)

FIG. 12

(Table 4-1)

| Sample No. | Composition of Film-Forming Material (Numerical Value Represents Atomic %) | Total Amount of Al,Ti,Fe,Ni,Mo,W [Atomic %] | Structure of Optical Disc |
|---|---|---|---|
| Sample 40 | AgPd$_{0.9}$Cu$_{4.0}$Al$_{3.4}$ | 3.4 | Single Plate |
| Sample 41 | AgPd$_{0.9}$Cu$_{4.0}$Al$_{7.5}$ | 7.5 | Single Plate |
| Sample 42 | AgPd$_{0.9}$Cu$_{4.0}$Fe$_{1.4}$ | 1.4 | Single Plate |
| Sample 43 | AgPd$_{0.9}$Cu$_{4.0}$Fe$_{3.4}$ | 3.4 | Single Plate |
| Sample 44 | AgPd$_{0.4}$Cu$_{4.2}$Fe$_{3.0}$ | 3.0 | Single Plate |
| Sample 45 | AgPd$_{0.9}$Cu$_{4.0}$Al$_{2.2}$ | 2.2 | Single Plate |
| Sample 46 | AgPd$_{0.9}$Cu$_{4.0}$Al$_{2.0}$Ti$_{1.6}$ | 3.6 | Single Plate |
| Sample 47 | AgPd$_{0.9}$Cu$_{4.0}$Al$_{3.3}$Ti$_{1.6}$ | 4.9 | Single Plate |
| Sample 48 | AgPd$_{0.9}$Cu$_{4.0}$Al$_{1.0}$ | 1.0 | Single Plate |
| Sample 49 | AgPd$_{0.9}$Cu$_{1.5}$Ti$_{1.8}$ | 1.8 | Single Plate |
| Sample 50 | AgPd$_{0.9}$Cu$_{1.5}$Ti$_{3.0}$ | 3.0 | Single Plate |
| Sample 51 | AgPd$_{0.9}$Cu$_{1.5}$Al$_{2.1}$Ti$_{1.7}$ | 3.8 | Single Plate |
| Sample 52 | AgPd$_{0.9}$Cu$_{1.5}$Al$_{3.4}$Ti$_{1.7}$ | 5.1 | Single Plate |
| Sample 53 | AgPd$_{0.9}$Cu$_{1.0}$Ni$_{2.3}$ | 2.3 | Single Plate |
| Sample 54 | AgPd$_{0.9}$Cu$_{8.2}$Ni$_{4.2}$ | 4.2 | Single Plate |
| Sample 55 | AgPd$_{0.9}$Cu$_{1.0}$Mo$_{2.5}$ | 2.5 | Single Plate |
| Sample 56 | AgPd$_{0.9}$Cu$_{7.5}$Mo$_{2.5}$ | 2.5 | Single Plate |

FIG. 13

| Sample No. | Reflectance Obtained at The Initial Stage R1[%] | Reflectance Obtained at The Initial Stage R2[%] | Reflectance Obtained after Storage Test R3[%] | Reflectance Obtained after Storage Test R4[%] | Amount in Which Reflectance Was Changed before And after Storage Test \|R1 − R3\| [%] | Jitter Obtained at The Initial Stage [%] | Jitter Obtained after Storage Test [%] |
|---|---|---|---|---|---|---|---|
| Sample 40 | 20.9 | — | 20.8 | — | 0.1 | 6.5 | 6.5 |
| Sample 41 | 20.3 | — | 19.5 | — | 0.8 | 6.6 | 7.0 |
| Sample 42 | 21.7 | — | 22.5 | — | 0.8 | 6.5 | 6.6 |
| Sample 43 | 22.0 | — | 21.8 | — | 0.2 | 6.5 | 6.5 |
| Sample 44 | 20.7 | — | 20.4 | — | 0.3 | 6.5 | 6.5 |
| Sample 45 | 21.5 | — | 22.0 | — | 0.5 | 6.6 | 6.6 |
| Sample 46 | 19.5 | — | 19.7 | — | 0.2 | 6.5 | 6.5 |
| Sample 47 | 20.8 | — | 20.9 | — | 0.1 | 6.5 | 6.5 |
| Sample 48 | 22.0 | — | 22.8 | — | 0.8 | 6.5 | 6.8 |
| Sample 49 | 18.5 | — | 19.0 | — | 0.5 | 6.6 | 6.5 |
| Sample 50 | 18.8 | — | 18.6 | — | 0.2 | 6.6 | 6.6 |
| Sample 51 | 21.0 | — | 21.2 | — | 0.2 | 6.5 | 6.5 |
| Sample 52 | 21.5 | — | 21.7 | — | 0.2 | 6.5 | 6.6 |
| Sample 53 | 21.5 | — | 21.8 | — | 0.3 | 6.6 | 6.7 |
| Sample 54 | 19.5 | — | 18.6 | — | 0.9 | 6.6 | 6.7 |
| Sample 55 | 21.0 | — | 21.3 | — | 0.3 | 6.6 | 6.7 |
| Sample 56 | 20.5 | — | 19.7 | — | 0.8 | 6.6 | 6.7 |

(Table 4-2)

FIG. 14

| Sample No. | Composition of Film-Forming Material (Numerical Value Represents Atomic %) | Total Amount of Al,Ti,Fe,Ni,Mo,W [Atomic %] | Structure of Optical Disc |
|---|---|---|---|
| Sample 57 | AgPd0.9Cu1.0W1.1 | 1.1 | Single Plate |
| Sample 58 | AgPd0.9Cu4.1W1.5 | 1.5 | Single Plate |
| Sample 59 | AgPd0.9Cu1.0W2.4 | 2.4 | Single Plate |
| Sample 60 | AgPd0.9Cu6.5W2.6 | 2.6 | Single Plate |
| Sample 61 (Inventive Example 9) | AgPd0.9Cu4.0Al2.2 | 2.2 | Laminating Plate |
| Sample 62 (Inventive Example 10) | AgPd0.9Cu1.5Ti1.8 | 1.8 | Laminating Plate |
| Sample 63 (Inventive Example 11) | AgPd0.9Cu1.0Ni2.3 | 2.3 | Laminating Plate |
| Sample 64 (Inventive Example 12) | AgPd0.9Cu1.0Mo2.5 | 2.5 | Laminating Plate |
| Sample 65 (Inventive Example 13) | AgPd0.9Cu8.1W2.6 | 2.6 | Laminating Plate |
| Sample 66 (Comparative Example 7) | AgPd0.9Cu4.0Al9.0 | 9.0 | Single Plate |
| Sample 67 (Comparative Example 8) | AgPd0.9Cu1.5 | 0.0 | Single Plate |
| Sample 68 (Comparative Example 9) | AgPd0.9Cu1.5 | 0.0 | Single Plate |
| Sample 69 (Comparative Example 10) | AgPd0.9Cu1.5 | 0.0 | Laminating Plate |
| Sample 70 (Comparative Example 11) | AgPd0.9Cu4.0 | 0.0 | Laminating Plate |

(Table 5-1)

FIG. 15

| Sample No. | Reflectance Obtained at The Initial Stage R1[%] | Reflectance Obtained at The Initial Stage R2[%] | Reflectance Obtained after Storage Test R3[%] | Reflectance Obtained after Storage Test R4[%] | Amount in Which Reflectance Was Changed before And after Storage Test \|R1 − R3\| [%] | Jitter Obtained at The Initial Stage [%] | Jitter Obtained after Storage Test [%] |
|---|---|---|---|---|---|---|---|
| Sample 57 | 20.8 | — | 21.3 | — | 0.5 | 6.6 | 6.7 |
| Sample 58 | 20.6 | — | 20.5 | — | 0.1 | 6.6 | 6.6 |
| Sample 59 | 21.5 | — | 20.9 | — | 0.6 | 6.4 | 6.3 |
| Sample 60 | 20.5 | — | 19.6 | — | 0.9 | 6.6 | 6.7 |
| Sample 61(Inventive Example 9) | 23.5 | 24.2 | 23.6 | 24.0 | 0.5 | 6.7 | 6.4 |
| Sample 62(Inventive Example 10) | 20.6 | 21.5 | 20.9 | 21.7 | 0.3 | 6.7 | 6.8 |
| Sample 63(Inventive Example 11) | 20.2 | 20.4 | 20.5 | 20.6 | 0.3 | 6.6 | 6.6 |
| Sample 64(Inventive Example 12) | 20.8 | 20.0 | 20.4 | 20.5 | 0.4 | 6.5 | 6.7 |
| Sample 65(Inventive Example 13) | 18.8 | 19.2 | 19.2 | 19.4 | 0.4 | 6.4 | 6.6 |
| Sample 66(Comparative Example 7) | 21.2 | — | 20.4 | — | 0.8 | 6.6 | 7.7 |
| Sample 67(Comparative Example 8) | 21.9 | — | 24.6 | — | 2.7 | 6.5 | 6.8 |
| Sample 68(Comparative Example 9) | 20.7 | — | 22.1 | — | 1.4 | 6.5 | 7.0 |
| Sample 69(Comparative Example 10) | 24.0 | 23.8 | 25.9 | 24.0 | 1.9 | 6.6 | 6.8 |
| Sample 70(Comparative Example 11) | 23.5 | 24.7 | 24.9 | 24.6 | 1.1 | 6.6 | 6.6 |

(Table 5-2)

OPTICAL RECORDING MEDIUM

TECHNICAL FIELD

The present invention relates to an optical recording medium, such as a CD (Compact Disc) or a CD-ROM (CD-Read Only Memory), in which a translucent reflective film and a reflective film can be improved in weather resistance more and which can be manufactured more inexpensively.

BACKGROUND OF THE INVENTION

As optical recording medium for recording a variety of information such as audio information and video information, various types of optical recording mediums are available in the form of a read-only optical recording medium such as a CD and a CD-ROM, a rewritable optical recording medium such as a magneto-optical disk and a phase-change optical disc and a write-once optical disc such as a CD-R made of an organic material.

Information recording layers comprising these optical recording mediums are indented to form thereon very small indentations such as phase pits and pregrooves to record data information, a tracking servo signal and the like.

Recently, there is an increasing demand for realizing optical recording medium capable of recording a larger amount of information, and a DVD (Digital Versatile Disc) of a two-layer structure having laminated first and second information recording layers, for example, becomes commercially available.

FIG. 4 is a schematic cross-sectional view illustrating an optical recording medium 200 of a two-layer structure in which a first information recording layer 231 and a second information recording layer 232 are laminated to each other.

In the first information recording layer 231, a translucent reflective film 223 made of a suitable material, such as Au, Si, AgPdCu and AgPdTi, is deposited on first very small indentations 211 which are formed at the same time a first substrate 201 is molded by injection molding.

In the second information recording layer 232, a reflective film 224 composed of a suitable thin film such as an Al thin film and an Al alloy thin film, is deposited on second very small indentations 222 which are formed at the same time a second substrate 202 is molded by injection molding.

A transparent adhesive layer 203 laminates the first and second substrates 201 and 202 with the first and second information recording layers 231 and 232 being facing to each other to form a two-layer information recording layer.

It is desirable that a set of optical heads should be used to reproduce or record or to reproduce and record (hereinafter simply referred to as "reproduce or record") information from the first and second information recording layers 231 and 232 of the optical recording medium 200 with irradiation of laser beams from the same side of the optical recording medium, e.g., from the first substrate 201 side, for example, so that a drive apparatus therefor can be simplified, the optical heads can access these information recording layers 231 and 232 in a short time and can continuously record or reproduce these information recording layers.

When the optical head irradiates laser beams on the first and second information recording layers 231 and 232 from the same side of the optical recording medium to record or reproduce or record and reproduce the first and second information recording layers, the same optical head focuses a laser beam L on the first information recording layer 231 to record or reproduce or record and reproduce the first information recording layer 231 as shown by a solid line in FIG. 4 and the same optical head focuses a laser beam L on the second information recording layer 232 to record or reproduce or record and reproduce the second information recording layer 232 as shown by a dotted line in FIG. 4.

In order that the same optical head may record or reproduce or record and reproduce the first and second information recording layers 231 and 232 with irradiation of laser beams, the first information recording layer 231 has the translucent reflective film 223 formed at its entrance side for inward laser beams to reflect part of irradiated laser beams so that the first information recording layer 231 may be recorded or reproduced and to pass part of laser beams to allow part of laser beams to travel to the second information recording layer 232 so that the second information recording layer 232 may be recorded or reproduced.

The transparent adhesive layer 203, made of an adhesive material having a high transmittance with respect to laser beams, laminates the first and second information recording layers 231 and 232 with a distance long enough to prevent their reproduced signal from interfering with each other. Therefore, the optical heads can adjust objective lenses so as to properly focus the laser beams on the positions corresponding to the respective information recording layers 231 and 232, thereby making it possible to reproduce information from the respective information recording layers with high accuracy.

Design of films of the translucent reflective film 223 of the first information recording layer becomes extremely important to realize the above-mentioned signal reproducing method.

Au, Si, AgPdCu and AgPdTi are used as materials for forming the translucent reflective film 223 as described above.

So far these materials have been used as the materials of the translucent reflective film because they can satisfy optical characteristics of the translucent reflective film 223 from a standpoint of reflectance and transmittance relative to laser beams and they can be easily deposited as thin films by sputtering.

However, Au encounters with a problem in which costs of materials increase. Although Si is relatively inexpensive, it is poor in adhesive property with which it is bonded to the adhesive material comprising the transparent adhesive agent layer 203 or it is bonded to the material of the substrate 201. Accordingly, silicon is not sufficiently reliable in mechanical deformation such as bending or warping or under severe circumstances with high humidity.

Further, when the Si film is compared with metal thin films, Si is easily separated from the inside of a sputtering chamber where it is stuck in the sputtering process when the film is deposited, i.e., so-called particles are easily produced so that an error rate is caused to be degraded.

The translucent reflective film needs a film thickness ranging from 5[nm] to 25[nm] when it is made of metals or Si semiconductor materials and so on that have been so far used to form ordinary translucent reflective films. This film thickness of the translucent reflective film is thin as compared with a film thickness ranging from 35[mm] to 60[nm] of a reflective film of an ordinary compact disc, for example. The metals or the Si semiconductor materials and the like for use in the ordinary translucent reflective film are easily oxidized at their surface by influences exerted from the substrate 201 side after they have been stored for a long time and further after they have been stored under circumstances with high temperature and high humidity. Accordingly, oxidation produced on the surface changes a reflectance of the translucent reflective film having such film thickness considerably, and this translucent reflective film is poor in weather resistance.

The translucent reflective film 223 is damaged not only by the influence from the substrate 201 side but also by oxidation from a contact portion where it is brought in contact with the transparent adhesive agent layer 203. The oxidation from the contact portion changes the reflectance of the translucent reflective film and deteriorates the jitter of the reproduced signal unavoidably.

Apart from the problem of the above-mentioned oxidation, the translucent reflective film encounters with a phenomenon in which atoms are caused to move within the deposited film to increase thermal conductivity or reflectance of the translucent reflective film after the translucent reflective film has been left under circumstances with high temperature where so-called annealed effect happens. This phenomenon becomes a serious problem depending upon compositions of the translucent reflective film.

The optical recording medium having the multilayer structure have various problems that should be solved when to make its translucent reflective film. To improve the weather resistance of the translucent reflective film and to reduce the cost thereof are important problems that should be solved when to make the optical recording medium having the multilayer structure commercially available on the market.

Weather resistance of the reflective film is important not only in the reflective film of the optical recording medium having the multilayer structure but also in the reflective films for use in rewritable optical recording mediums such as a magneto-optical recording medium, a phase-change optical recording medium and a dye-system optical recording medium in which various material films are laminated as information recording layers. When the reflective film is degraded due to aged deterioration such as oxidation, the deteriorated reflective film changes not only quality of the reproduced signal but also recording conditions such as recording sensitivity.

The AgPdCu thin film or the AgPdTi thin film is inexpensive as compared with a simple substance of Au from a money standpoint and cannot be separated from the adhesive material or the material of the substrate unlike the Si film.

Recently, a demand for higher recording density or larger recording capacity is increasing, and laser light with a short wavelength is used as laser light for use in recording or reproducing information, whereby surface recording density can be increased. In this case, recording pits should be formed with higher accuracy, and even though the amount in which the jitter in the reproduced signal is deteriorated is small to the extent that it is allowable when the surface recording density is low, such very small amount of the deteriorated jitter raises a serious problem as the surface recording density increases.

Further, as the information recording layer is formed as the information recording layer having the two-layer structure as described above or the information recording layer is formed as an information recording layer having a multilayer structure of more than two layers, the translucent reflective film in each information recording layer at the entrance end side of inward light is progressively decreasing its film thickness more because reflectance and transmittance of each layer and the like should be selected properly. Therefore, this translucent reflective film needs higher weather resistance.

Specifically, this translucent reflective film needs high weather resistance to the extent that reflectance can be prevented from being changed and that the jitter in the reproduced signal can be prevented from being deteriorated under severe circumstances for a longer time.

Furthermore, a demand for manufacturing optical recording mediums more inexpensively also is increasing more than before.

An object of the present invention is to provide an optical recording medium in which weather resistance of a translucent reflective film and a reflective film comprising information recording layers of an optical recording medium, in particular, weather resistance of the translucent reflective film with a special characteristic such as translucency can be improved and in which a cost thereof can be reduced.

SUMMARY OF THE INVENTION

According to the present invention, there is provided an optical recording medium including at least an information recording layer and a reflective film and in which the reflective film thereof is comprised of an AgCu alloy thin film containing Cu the content of which is greater than 3.0 or equal to [atomic %] and less than or equal to 6.5[atomic %].

Moreover, according to the present invention, there is provided an optical recording medium in which at least a first information recording layer and a second information recording layer are laminated to each other and in which the first information recording layer has a translucent reflective film formed thereon and the second information recording layer has a reflective film formed thereon and the translucent reflective film is comprised of an AgCu alloy thin film containing Cu the content of which is greater than or equal to 3.0[atomic %] and less than 6.5 or equal to [atomic %].

In this arrangement, information is reproduced from the second information recording layer with irradiation of light that has passed through the first information recording layer.

Moreover, according to the present invention, there is provided an optical recording medium including at least an information recording layer and a reflective film and in which the reflective film thereof is comprised of an AgCu containing alloy thin film containing Cu the content of which is greater than or equal to 2.0[atomic %] and less than or equal to 9.0 [atomic %] and this AgCu containing alloy is made of either an AgCu containing ternary alloy or quaternary alloy containing one or two chemical elements of Al, Ti, Fe, Ni, Mo, W and whose total content of the chemical elements is greater than or equal to 0.5[atomic %] and less than or equal to 8.1[atomic %].

Further, according to the present invention, there is provided an optical recording medium in which at least a first information recording layer and a second information recording layer are laminated to each other and in which the first information recording layer has a translucent reflective film formed thereon, the second information recording layer has a reflective film formed thereon, the translucent reflective film thereof is composed of an AgCu containing alloy thin film containing Cu the content of which is greater than or equal to 2.0[atomic %] and less than or equal to 9.0 [atomic %] and this AgCu containing alloy is made of an AgCu containing ternary alloy or quaternary alloy containing one or two chemical elements of Al, Ti, Fe, Ni, Mo, W and whose total content of the chemical elements is greater than or equal to 0.5[atomic %] and less than or equal to 8.1[atomic %].

In this arrangement, information is reproduced from the second information recording layer with irradiation of light that has passed through the first information recording layer.

Moreover, according to the present invention, there is provided an optical recording medium including at least an information recording layer and a reflective film and in which the reflective film thereof is comprised of an AgCu containing alloy thin film containing Cu the content of which is greater than or equal to 1.5[atomic %] and less than or equal to 9.0 [atomic %] and this AgCu containing alloy is made of an AgCuPd containing quaternary alloy or quinary alloy containing Pd the content of which is greater than or equal to 0.1[atomic %] and less than or equal to 2.0[atomic %] and which contains one or two chemical elements of Al, Ti, Fe, Ni, Mo, W and whose total content of the chemical elements is greater than or equal to 0.5 [atomic %] and less than or equal to 8.1[atomic %].

Further, according to the present invention, there is provided an optical recording medium in which at least a first information recording layer and a second information recording layer are laminated to each other and in which the first information recording layer has a translucent reflective film formed thereon, the second information recording layer has a reflective film formed thereon, the translucent reflective film is comprised of an AgCu containing alloy thin film containing Cu the content of which is greater than 1.5 or equal to [atomic %] and less than 9.0 or equal to [atomic %] and this AgCu alloy is made of either an AgCuPd containing quaternary alloy or quinary alloy containing Pd the content of which is greater than or equal to 0.1[atomic %] and less than or equal to 2.0[atomic %] and which contains one or two chemical elements of Al, Ti, Fe, Ni, Mo, W and whose total content of the chemical elements is greater than or equal to 0.5[atomic %] and less than or equal to 8.1 [atomic %].

In this arrangement, information is reproduced from the second information recording layer with irradiation of light that has passed through the first information recording layer.

Then, in the above-mentioned optical recording medium including at least the first and second information recording layers, the first information recording layer is formed on a first substrate, the second information recording layer is formed on a second substrate, the first and second substrates can be laminated to each other in such a manner that information recording layers thereof may be facing to each other and information is reproduced from the first and second information recording layers with irradiation of light from the first substrate side.

As described above, according to the arrangement of the present invention, in the optical recording medium including the reflective film, the reflective film thereof is composed of an AgCu alloy, an AgCu containing alloy and further an AgCuPd containing alloy thin film and in the optical recording medium including the reflective film and the translucent reflective film, at least the translucent reflective film is composed of an AgCu alloy, an AgCu containing alloy and further an AgCuPd containing alloy thin film. Therefore, it became possible to obtain an optical recording medium which can be made excellent in weather resistance and which can be made inexpensive.

Further, according to the present invention, in the AgCu containing alloy and AgCuPd containing alloy comprising the reflective film or the translucent reflective film or the reflective film and the translucent reflective film, since added chemical elements suitable for comprising these alloys are specified and their containing ratios are specified, the reflective film or the translucent reflective film or the reflective film and the translucent reflective film can be improved in weather resistance. Even after the optical recording medium has been stored for a long time under the conditions of high temperature and high humidity, for example, optical characteristics such as reflectance and transmittance required by the information recording layer of the optical recording medium or recording density can be effectively avoided from being changed.

According to the arrangement of the present invention, as will become clear from descriptions which will be made later on, it is intended to obtain an optical recording medium which can exhibit higher weather resistance and which can be made inexpensive, accordingly, which can be manufactured inexpensively.

BRIEF DESCRIPTION OF DRAWINGS

FIG. 5 is a diagram showing a relationship between recording power and a CNR obtained before and after the storage tests.

FIG. 6 is a table (table 1-1) listing or enumerating arrangements of samples having various optical disc structures.

FIG. 7 is a table (table 1-2 enumerating characteristics of the respective samples shown in FIG. 6.

FIG. 8 is a table (table 2-1) enumerating arrangements of samples having various optical disc structures.

FIG. 9 is a table (2-2) enumerating characteristics of the respective samples shown in FIG. 8.

FIG. 10 is a table (3-1) enumerating arrangements of samples having various optical disc structures.

FIG. 11 is a table (table 3-2 enumerating characteristics of the respective samples shown in FIG. 10.

FIG. 12 is a table (table 4-1) enumerating arrangements of samples having various optical disc structures.

FIG. 13 is a table (table 4-2) enumerating characteristics of the respective samples shown in FIG. 12.

FIG. 14 is a table (table 5-1) enumerating arrangements of samples having various optical disc structures.

FIG. 15 is a table (table 5-2) enumerating characteristics of the respective samples shown in FIG. 14.

DETAILED DESCRIPTION OF THE PRESENTLY PREFERRED EMBODIMENTS

An optical recording medium according to the embodiments of the present invention will be described below with reference to the drawings. It is needless to say that the optical recording mediums according to the present invention are not limited to the following examples.

Figure 1:
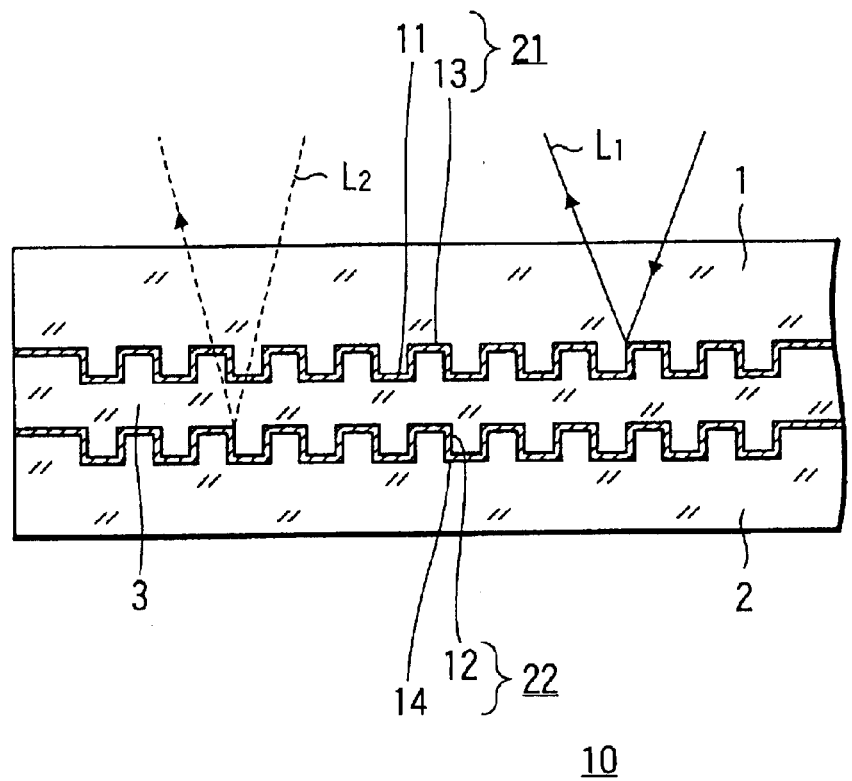
FIG. 1 is a schematic cross-sectional view showing an example of an optical recording medium including two-layer information recording layers according to the present invention.

FIG. 1 is a schematic cross-sectional view showing an optical recording medium 10 according to the present invention.

In the optical recording medium 10, first and second substrates 1 and 2 are laminated to each other through a transparent adhesive agent layer 3 in such a manner that information recording layers 21 and 22 formed on these substrates 1 and 2 maybe facing to each other. This optical recording medium is manufactured in accordance with a DVD (Digital Versatile Disc) format having a two-layer structure in which the first and second information recording layers 21 and 22 are laminated to each other.

The first and second information recording layers 21 and 22 are indented to have first and second very small indentations 11 and 12 corresponding to recording information. The first very small indentations 11 have a translucent reflective film 13 deposited thereon to pass or reflect the irradiated light for recording and/or reproducing the optical recording medium. The second very small indentations 12 have a reflective film 14 deposited thereon to reflect similar irradiated light.

The first substrate 1 can be molded by injection molding of a plastic material such as polycarbonate that can pass the above-mentioned irradiated light. In this case, the first very small indentations 11 also can be formed on the first information recording layer 21 on the first substrate 1 at the same time the first substrate 1 is molded by injection molding.

The second substrate 2 can be similarly molded by injection molding of a plastic material such as polycarbonate regardless of the kind of plastic materials, such as a transparent plastic material or an opaque plastic material. The second very small indentations 12 can be formed on the second information recording layer 22 at the same time the second substrate 2 is molded.

A translucent reflective film 13 is deposited on the first very small indentations 11 of the first information recording layer 21.

This translucent reflective film 13 is made of an AgCu alloy thin film or an AgCu containing alloy thin film having a film thickness ranging from 10[nm] to 15[nm] such that it may reflect and pass part of the above-mentioned irradiated light, e.g., laser beams.

AgCu alloy containing Cu the content of which is greater than or equal to 3.0[atomic %] and less than or equal to 6.5[atomic %] can be applied as the AgCu alloy comprising the translucent reflective film 13.

The translucent reflective film 13 may be made of an AgCu containing ternary alloy or quaternary alloy which is an AgCu alloy containing Cu the content of which is greater than or equal to 2.0[atomic %] and less than or equal to 9.0[atomic %] and which contains one or two chemical elements of Al, Ti, Fe, Ni, Mo, W and whose total content of the chemical elements is greater than or equal to 0.5 [atomic %] and less than or equal to 8.1[atomic %].

Alternatively, the translucent reflective film 13 may be made of an AgCuPd containing quaternary alloy or quinary alloy which is an AgCu containing alloy containing Cu the content of which is greater than or equal to 1.5[atomic %] and less than or equal to 9.0[atomic %] and which contains Pd the content of which is greater than or equal to 0.1[atomic %] and less than or equal to 2.0[atomic %] and which contains at least one or more than two chemical elements of Al, Ti, Fe, Ni, Mo, W and in which the total content of these chemical elements is greater than or equal to 0.5[atomic %] and less than or equal to 8.1 [atomic %].

In the second information recording layer 22, a reflective film 14 is deposited on the above-mentioned second very small indentations 12.

This reflective film 14 may be made of a metal material having a high reflectance, e.g., Au, an alloy whose principal component is Au, e.g., Ag or an alloy whose principal component is Ag, or Pt or an alloy whose principal component is Pt or Cu or an alloy whose principal component is Cu and the like.

Moreover, in order to reduce the costs, the reflective film 14 may be made of an Al alloy in which other metal material such as Si, Ti or Cr is added to Al.

However, in order to improve weather resistance of the reflective film and in order to reduce the cost of the reflective film, the reflective film 14 may be made of the above-mentioned AgCu alloy, AgCu containing ternary or quaternary alloy and AgCuPd containing quaternary or quinary alloy having similar materials and compositions to those of the above-mentioned translucent reflective film, and the film thickness of the reflective film can be selected in a range of from 35[nm] to 60[nm], for example.

The translucent reflective film 13 and the reflective film 14 can both be deposited by conventional sputtering, in general, magnetron sputtering.

A set of optical heads should be used to reproduce signals from the first and second information recording layers 21 and 22 or to record signals on the first and second information recording layers of the optical recording medium 10 with irradiation of laser beams from the same side of the optical recording medium 10, e.g., from the first substrate 1 side in the arrangement shown in FIG. 1 so that a drive apparatus therefor can be simplified, the optical heads can access these information recording layers 21 and 22 in a short time and can continuously record or reproduce these information recording layers.

When the optical head irradiates laser beams on the first and second information recording layers from the same side of the optical recording medium 10 to reproduce or record the first and second information recording layers, the same optical head focuses a laser beam L on the first information recording layer 21 to reproduce or record the first information recording layer as shown by a solid line in FIG. 1 and the same optical head focuses a laser beam L on the second information recording layer 22 to reproduce or record the second information recording layer as shown by a dotted line in FIG. 1.

Next, a case in which the optical recording medium according to the present invention is applied to a magneto-optical recording medium will be described.

Figure 2:
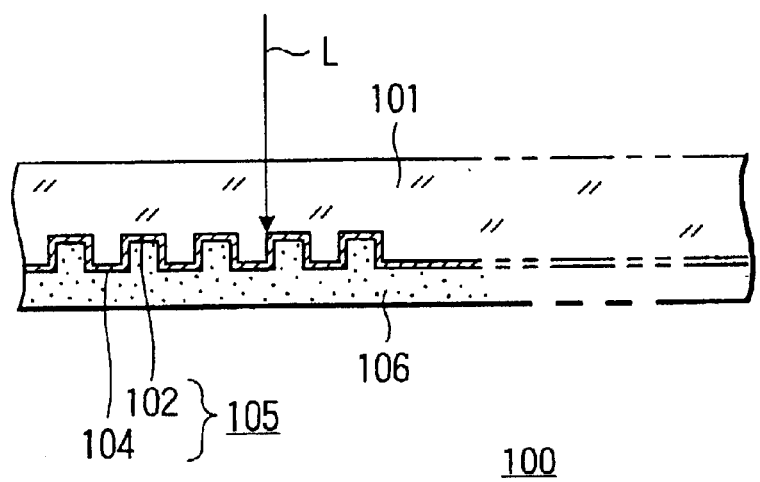
FIG. 2 is a schematic cross-sectional view showing another example of an optical recording medium according to the present invention.

FIG. 2 is a schematic cross-sectional view showing an example of a magneto-optical recording medium 100.

The magneto-optical recording medium 100 comprises a substrate 101 made of a resin having transmittance such as polycarbonate, very small indentations 102 such as pregrooves, formed on the substrate at the same time the substrate is formed by injection molding, an information layer 105 formed of a magneto-optical recording layer 104 on the very small indentations 102 and a protective layer 106 formed on the information layer 105.

Figure 3:
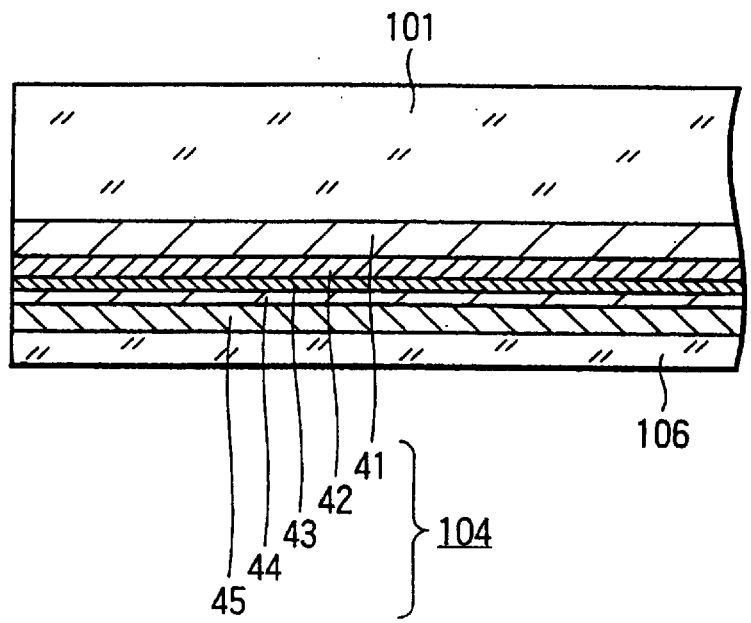
FIG. 3 is a schematic cross-sectional view showing a magneto-optical recording layer portion of a magneto-optical recording medium in an enlarged-scale.
Figure 4:
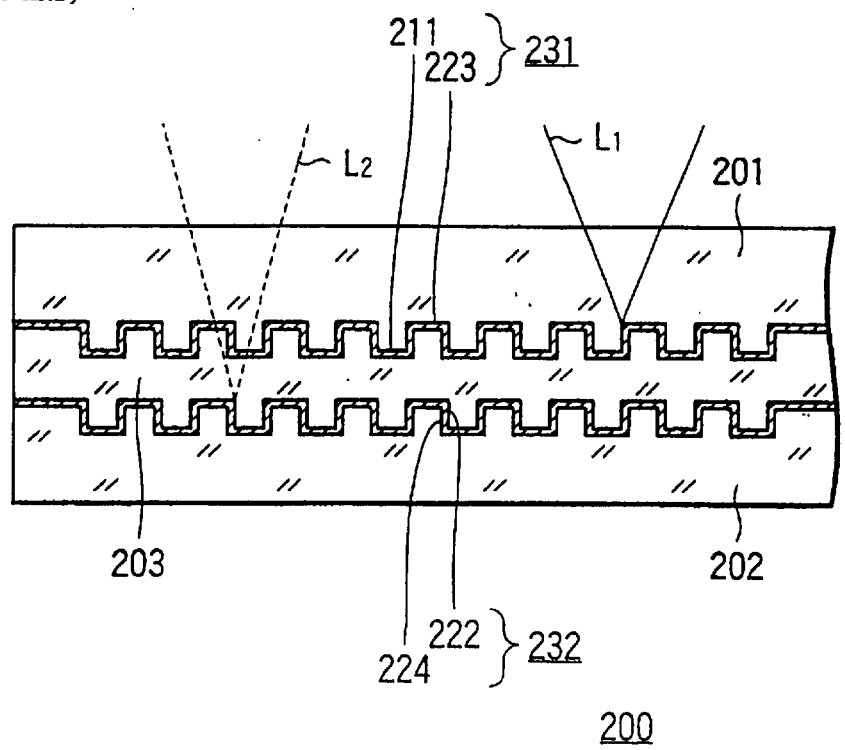
FIG. 4 is a schematic cross-sectional view showing an example of an optical recording medium according to the prior art.

FIG. 3 is a schematic cross-sectional view showing a lamination layer structure of the magneto-optical recording layer 104 of the magneto-optical recording medium 100 shown in FIG. 2.

The magneto-optical recording layer 104 may have a laminating layer arrangement shown in FIG. 3.

This magneto-optical recording layer 104 comprises the substrate 101, for example, on which a first dielectric layer 41 made of $SiN_x$, for example, and whose film thickness is approximately 40[nm], a recording layer 42 made of TbFeCo, for example, and whose film thickness is approximately 15[nm], a translucent heat adjustment film 43 made of an AgCu containing alloy, which will be described later on, and whose film thickness is approximately 10[nm], a second dielectric layer 44 made of $SiN_x$, for example, and whose film thickness is approximately 20[nm] and a reflective film 45 made of an AgCu containing alloy, which will be described later on, and whose film thickness is approximately 40[nm] are laminated, in that order.

The heat adjustment film 43 and the reflective film 45 shown in FIG. 3 can be made of an AgCu alloy thin film or an AgCu containing alloy thin film similarly to the aforementioned translucent reflective film 13 and the reflective film 14.

AgCu alloy containing Cu the content of which is greater than or equal to 3.0[atomic %] and less than or equal to 6.5[atomic %] can be applied to the AgCu alloy.

Alternatively, the translucent reflective film and the reflective film can be made of an AgCu containing ternary alloy or quaternary alloy which is an AgCu containing alloy containing Cu the content of which is greater than or equal to 2.0[atomic %] and less than or equal to 9.0[atomic %] and which contains one or two chemical elements of Al, Ti, Fe, Ni, Mo, W and in which the total content of the chemical elements is greater than or equal to 0.5[atomic %] and less than or equal to 8.1[atomic %].

Alternatively, the translucent reflective film and the reflective film can be made of an AgCuPd containing quaternary or quinary alloy which is an AgCu containing alloy containing Cu the content of which is greater than or equal to 1.5[atomic %] and less than or equal to 9.0[atomic %] and which contains Pd the content of which is greater than or equal to 0.1[atomic %] and less than or equal to 2.0[atomic %] and which contains at least one or more than two chemical elements of Al, Ti, Fe, Ni, Mo, W and in which the total contents of the chemical elements is greater than or equal to 0.5[atomic %] and less than or equal to 8.1[atomic %].

The protective layer 106 may be made of a conventional ultraviolet-curing resin that can be cured by spin-coating.

Information is recorded on or reproduced from the magneto-optical recording medium 100 shown in FIG. 2 by laser beams irradiated on the magneto-optical recording medium from the side of the substrate 101.

Specifically, the optical head focuses a laser beam L on the information layer 105 as shown by a solid line in FIG. 2 to record information on the magneto-optical recording medium or to reproduce information from the magneto-optical recording medium.

Next, in order to understand the characteristics of the optical recording medium according to the present invention, we had manufactured samples having respective disc structures including the embodiments of the optical recording medium according to the present invention, whereafter we had measured respective characteristics, i.e., weather resistances.

In these samples, the reason that we had manufactured samples of discs of structures in which an information recording layer is formed on only a one substrate (this sample of disc will hereinafter be referred to as a "single plate") whereafter we have measured characteristics of these samples will be described below. That is, when the thickness of the substrate, for example, is selected to be 0.6[nm], since entire rigidity of such substrate is inferior to that of the structure in which first and second information recording layers are sandwiched between two substrates, the substrate is warped considerably after it has been stored by the storage test, and adhesion between the alloy thin film comprising the translucent reflective film, for example, and the substrate is lowered, thereby causing the alloy thin film and the substrate to be easily separated from each other. As a consequence, it becomes able to estimate weather resistance very strictly.

Moreover, in the sample concerning the optical disc of the structure in which two substrates corresponding to the first and second substrates 1 and 2 corresponding to the first and second information recording layers 21 and 22 are laminated to each other, the alloy thin film corresponding to the reflective film 14 is made of an AlTi material of an ordinary alloy thin film unlike the alloy thin film in the translucent reflective film, because deterioration of such sample of the above optical disc in which alloy thin films of different nature are laminated to each other is unavoidably accelerated under circumstances with high humidity and therefore we can estimate weather resistance of such sample more strictly. Specifically, in the samples of this structure in which two substrates are laminated to each other, when the translucent reflective film and the reflective film are both made of an AgCu alloy, an AgCu containing alloy or an AgCuPd containing alloy, these samples can exhibit more excellent weather resistance.

That is, we have studied characteristics of the materials of the translucent reflective films more strictly based upon the respective samples.

[Sample 1]:

First, a 0.6[nm]-thick substrate was molded by injection molding of polycarbonate.

At the same time the substrate was molded, very small indentations, i.e., pit data rows modulated by using an EFM code in which a track pitch was 0.74[μm], a depth of pit was 110 [nm] and a shortest pit length was 0.44[μm] were formed on one major surface of this substrate.

A translucent reflective film made of $Ag_{100-x}Cu_x$ (x is atomic %) where x=3.0 and whose film thickness ranges from 10[nm] to 15[nm] was deposited on the substrate in which the pit data rows are formed by magnetron sputtering, thereby resulting in the first information recording layer 21 being formed.

Next, a protective layer was formed over the whole surface of the AgCu alloy translucent reflective film by spin-coating and curing a ultraviolet-curing resin.

[Sample 2]:

In a similar arrangement to that of the sample 1, a translucent reflective film had a composition in which x=6.5.

[Sample 3] (Inventive Example 1):

This sample had a structure corresponding to that shown in FIG. 1 and in which the first and second substrates 1 and 2 including the first and second information recording layers 21 and 22 are laminated to each other.

In this case, the first substrate 1 having the arrangement similar to that of the substrate of the sample 1 was prepared. An AgCu alloy thin film having a composition of $Ag_{100-x}Cu_x$ where x=3.0 was deposited on the first substrate by magnetron sputtering to deposit the translucent reflective film 13 having the film thickness ranging from 10 to 15[nm], thereby resulting in the first information recording layer 21 being formed.

On the other hand, there was manufactured the second substrate 2 having the arrangement similar to that of the first substrate 1. On the second substrate 2, there was deposited the reflective film 14 made of an AlTi alloy thin film having a film thickness 50[nm] by magnetron sputtering, thereby resulting in the second information recording layer 22 being formed.

Then, the first and second substrates 1 and 2 were laminated to each other by using a ultraviolet-curing resin as a transparent adhesive agent in such a manner that their information recording layers 21 and 22 may be facing to each other, thereby resulting in an optical disc having a laminated structure being manufactured.

In this connection, the film thickness of the AgCu containing alloy film deposited on the first substrate 1 is selected in such a fashion that, when an Al alloy film having a film thickness ranging from 35 to 60[nm] or an Ag alloy film having a film thickness ranging from 30 to 60[nm] is formed as the reflective film 14 on the second substrate 2 by laser beams having a wavelength of 660[nm], reflectance of the first information recording layer 21 and that of the second information recording layer 22 may become nearly equal to each other.
[Sample 4]

COMPARATIVE EXAMPLE 1

Although this sample had an arrangement similar to that of the sample 1 and was manufactured by a similar method, its alloy thin film has an alloy atomic composition expressed as $Ag_{100-x}Cu_x$ where x=2.0.
[Sample 5]

COMPARATIVE EXAMPLE 2

Although this sample had an arrangement similar to that of the sample 1 and was manufactured by a similar method, its alloy thin film has an alloy atomic composition expressed as $Ag_{100-x}Cu_x$ where x=7.0.
[Sample 6]

COMPARATIVE EXAMPLE 3

Although this sample had an arrangement similar to that of the sample 1 and was manufactured by a similar method, its alloy thin film has an alloy atomic composition expressed as $Ag_{100-x}Cu_x$ where x=9.0
[Sample 7]

COMPARATIVE EXAMPLE 4

Although this sample had an arrangement similar to that of the sample 1 and was manufactured by a similar method, instead of its $Ag_{100-x}Cu_x$ alloy thin film, an Si film having a film thickness ranging from 10 to 15[nm] was deposited on the first substrate 1 by magnetron sputtering, thereby resulting in the first information recording layer 21 being formed.

Next, similarly to the first substrate 1, the reflective film 14 made of an AlTi alloy thin film having a film thickness of 50[nm] was deposited on the second substrate 2 by magnetron sputtering, thereby resulting in the second information recording layer 22 being formed.

Similarly to the sample 3, these first and second substrates 1 and 2 were laminated to each other by using the ultraviolet-curing resin as the transparent adhesive agent in such a manner that their information recording layers 21 and 22 may be facing to each other, whereby the optical disc of the laminated structure was manufactured.
[Sample 8]

COMPARATIVE EXAMPLE 5

Although this sample had the arrangement similar to that of the sample 1 and was manufactured by a similar method, an Ag film having a film thickness ranging from 10 to 15[nm] was deposited as its translucent reflective film.

The storage test under circumstances with high temperature and high humidity was effected on the above-mentioned respective samples 1 to 8 and reflectances [%] and jitter [%] of the respective information recording layers 21, 22 were measured, whereby ratios [%] at which reflectances of the information recording layers are changed before and after the storage test were calculated.

In the storage test under circumstances with high temperature and high humidity, the optical discs of the respective samples were left within a storage bath with RH circumstances having a temperature of 85° C. and a humidity of 90% for 100 hours.

Jitter values were measured by an optical pickup having a semiconductor laser having a wavelength of 660[nm] and an objective lens having a numerical aperture of 0.60.

Tables 1-1 and 1-2 of FIGS. 6 and 7 show compositions (atomic %) of materials of deposited translucent reflecting films, optical disc structures, measured results of reflectances [%] and jitters [%] of the respective information recording layers 21, 22 obtained before and after the storage test and amounts with which reflectances of the information recording layers were changed before and after storage test with respect to the respective samples 1 to 8.

In the tables, $R_1$[%] shows reflectances of the first information recording layers 21 of the respective samples (optical discs) of the single plate structure and the laminating structures obtained at the initial stage, i.e., reflectances obtained before the storage test, and $R_3$[%] shows reflectances obtained after the storage tests of these samples.

In the tables, $R_2$[%] shows reflectances of the second information recording layers 22 of the samples (optical discs) of the laminating structures obtained at the initial stage, and $R_4$[%] shows reflectances of the second information recording layers of these samples obtained after the storage test.

Further, the amount with which the reflectance is changed before and after the storage test is shown by $|R_1-R_3|$ [%].

It is to be understood that, with respect to the samples 1 to 3 in which $Ag_{100-x}Cu_x$ ($3 \leq x \leq 6.5$) thin films were deposited on the information recording layers of the optical discs of the single plate structures and the first information recording layers 21 of the optical discs of the laminating structures as shown on the tables 1 (FIGS. 6 and 7), the changes of the reflectances obtained before and after the storage test could be decreased to less than 1.0[%], the changes of the jitters obtained before and after the storage test could be suppressed to be less than 1[%] so that the optical characteristics with excellent weather resistance could be obtained.

In the samples 4 to 7 (comparative examples 1 to 4) the amounts in which the reflectances were changed before and after the storage test had exceeded 1.0[%]. In the sample 8 (comparative example 5), there arose a problem that the jitter value obtained after the storage test were increased so that a signal could not be reproduced with stability.

Next, there were manufactured samples 9 to 39 in which either an AgCu (Al, Ti, Fe, Ni, Mo, W) ternary alloy or quaternary alloy containing Cu the content of which is greater than or equal to 2.0[atomic %] and less than or equal to 9.0[atomic %] and which contains one or two chemical elements of Al, Ti, Fe, Ni, Mo, W and in which the total content of the chemical elements is greater than or equal to 0.5[atomic %] and less than or equal to 8.1[atomic %] was deposited on the information recording layers.
[Sample 9] to [Sample 31]:

These samples were optical discs of single plates having arrangements similar to that of the sample 1 and were manufactured by a similar method. In these samples, instead of the AgCu alloy film deposited on the substrate 1, the translucent reflective film 13 was made of an $Ag_{100-x-y}Cu_xA_y$ (A is one or two chemical elements of Al, Ti, Fe, Ni, Mo, W and x, y represent atomic % respectively) thin film having a film thickness ranging from 10 to 15[nm] where $2 \leq x \leq 9.0$ and $0.5 \leq y \leq 8.1$.

[Sample 32] (Inventive Example 2) to [Sample 38] (Inventive Example 8):

These samples of the laminating structures of the first and second substrates 1 and 2 having the first and second information recording layers 21 and 22 shown in FIG. 1 had arrangements similar to that of the sample 3 and were manufactured by the similar method. In these samples 32 to 38, the translucent reflective film 13 on the first substrate 1 was made of an $Ag_{100-x-y}Cu_xA_y$ (A is one or two chemical elements of Al, Ti, Fe, Ni, Mo, W and x, y represent atomic % respectively) alloy thin film having a film thickness ranging from 10 to 15[nm] where $2 \leq x \leq 9$ and $0.5 \leq y \leq 8.1$.

[Sample 39]

COMPARATIVE EXAMPLE 6

This sample had a similar arrangement to that of the sample 1 and was manufactured by a similar method. In this sample 39, the translucent reflective film 13 there of has an alloy atomic composition expressed as $Ag_{100-x-y}Cu_xA_y$ (A was Al and Ti) where x=5.4 and y=8.5.

Other conditions were similar to those of [sample 1] and the sample of the optical disc of the single plate structure was manufactured.

With respect to the above-mentioned samples 9 to 39, the compositions (atomic %) of the materials forming their translucent reflecting films and the optical disc structures are shown on tables 2-1 and 3-1 of FIGS. 8 and 10. The similar storage test under circumstances with high temperature and high humidity was effected on these samples and test results are shown on tables 2-2 and 3-2 of FIGS. 9 and 11.

In the samples 9 to 38 having the information recording layers of the optical disc of the single plate structures and the first information recording layers 21 of the optical disc of the laminating structures in which alloy atomic compositions were expressed as $Ag_{100-x-y}Cu_xA_y$ (A is at least one of Al, Ti, Fe, Ni, Mo, W) and in which $2 \leq x \leq 9$ and $0.5 \leq y \leq 8.1$, the amounts in which the reflectances were changed before and after the storage test could be decreased to be less than 1.0[%] and the amounts in which the jitters were changed before and after the storage test could be suppressed to be less than 1[%]. In particular, there could be obtained optical characteristics with excellent weather resistance.

On the other hand, in the sample 39 (comparative example 6), the amounts in which the reflectances were changed before and after the storage test exceeded 1.0[%] and the weather resistance was deteriorated.

Next, there are shown samples (optical discs) in which translucent reflective films made of AgCuPd containing quaternary alloy or quinary alloy containing Cu the content of which is greater than 1.5[atomic %] and less than 9.0 [atomic %] and which contains one or two chemical elements of Al, Ti, Fe, Ni, Mo, W and in which the total content of the chemical elements is greater than or equal to 0.5 [atomic %] and less than or equal to 8.1[atomic %] and which contains Pd the content of which is greater than or equal to 0.1[atomic %] and less than or equal to 2.0[atomic %] were deposited on the information recording layers.

[Sample 40] to [Sample 60]:

Although these samples had the single plate structures having similar structures to that of the sample 1 and were manufactured by the similar method, their translucent reflective films 13 had alloy atomic compositions expressed as $Ag_{100-x-y-z}Pd_zCu_xA_y$ (A is one of Al, Ti, Fe, Ni, Mo and W and x, y, z represent atomic % respectively) where $1.5 \leq x \leq 9.0$, $0.5 \leq y \leq 8.1$ and $0.1 \leq z \leq 2.0$.

[Sample 61] (Inventive Example 9) to [Sample 65] (Inventive Example 13):

Although these samples had similar structures to that of the sample 3 (inventive example 1) and were manufactured by the similar method, their translucent reflective films 13 had alloy atomic compositions expressed as $Ag_{100-x-y-z}Pd_zCu_xA_y$ (A is one of Al, Ti, Fe, Ni, Mo and W and x, y, z represent atomic % respectively) where $1.5 \leq x \leq 9.0$, $0.5 \leq y \leq 8.1$ and $0.1 \leq z \leq 2.0$.

[Sample 66]

COMPARATIVE EXAMPLE 7

Although this sample had a similar structure to that of the sample 1 and was manufactured by the similar method, its translucent reflective film 13 had an alloy atomic composition expressed as $Ag_{100-x-y-z}Pd_zCu_xA_y$ (A is Al) where x=4.0, y=9.0 and z=0.9.

[Sample 67]

COMPARATIVE EXAMPLE 8

Although this sample had a similar structure to that of the sample 1 and was manufactured by the similar method, its translucent reflective film 13 had an alloy atomic composition expressed as $Ag_{100-x-y-z}Pd_zCu_xA_y$ where x=1.5, y=0.0 and z=0.9.

[Sample 68]

COMPARATIVE EXAMPLE 9

Although this sample had a similar structure to that of the sample 1 and was manufactured by the similar method, its translucent reflective film 13 had an alloy atomic composition expressed as $Ag_{100-x-y-z}Pd_zCu_xA_y$ where x=1.5, y=0.0 and z=0.9.

[Sample 69]

COMPARATIVE EXAMPLE 10

Although this sample had a similar structure to that of the sample 3 and was manufactured by the similar method, its translucent reflective film 13 had an alloy atomic composition expressed as $Ag_{100-x-y-z}Pd_zCu_xA_y$ where x=1.5, y=0.0 and z=0.9.

[Sample 70]

COMPARATIVE EXAMPLE 11

Although this sample had a similar structure to that of the sample 3 and was manufactured by the similar method, its translucent reflective film 13 had an alloy atomic composition expressed as $Ag_{100-x-y-z}Pd_zCu_xA_y$ where x=4.0, y=0.0 and z=0.9.

With respect to the optical discs of the above-mentioned samples 57 to 70, tables 5-1 and 5-2 of FIGS. 14 and 15 show compositions (atomic %) of materials forming their translucent reflective films, optical disc structures and test results obtained after the similar storage tests effected under circumstances with high temperature and high humidity.

As shown on the tables 5-1 and 5-2 of FIGS. 14 and 15, in the samples 40 to 65 in which the first information recording layers 21 of the single plate structures and the laminating structures have alloy atomic compositions expressed as $Ag_{100-x-y-z}Pd_zCu_xA_y$ where A is one or two kinds of chemical elements of Al, Ti, Fe, Ni, Mo, W and $1.5 \leq x \leq 9.0$, $0.5 \leq y \leq 8.1$ and $0.1 \leq z \leq 2.0$, the amount with which the reflectances were changed before and after the storage test could be decreased to be less than 1.0[%], the amount in which the jitters were changed before and after the storage test could be suppressed to be less than 1[%], and in particular, optical characteristics with excellent weather resistance could be obtained.

In the sample 66 (comparative example 7), the jitter value obtained after the storage test was increased so that a signal could not be reproduced with high stability.

In the optical discs shown in the sample 67 (comparative example 8) to the sample 70 (comparative example 11), the amounts in which reflectances are changed before and after the storage test exceeded 1.0[%] and weather resistance was deteriorated.

As is clear from the above description, according to the present invention, the AgCu alloy thin film or the AgCu containing alloy thin film is applied to the information recording layer, the composition of the above alloy thin film is specified, the chemical element of the above composition is selected and the content of such chemical element is specified, whereby the weather resistance of the information recording layer can be improved, the amounts in which the optical characteristics such as the reflectance or the transmittance required by the information recording layer of the optical recording medium are changed after the optical recording medium has been stored for a long time under conditions with high temperature and high humidity can be suppressed to be low and the deterioration of the jitter can be avoided effectively. Moreover, the cost of the optical recording medium according to the present invention can be reduced as compared with that of the prior-art optical recording medium.

While the optical discs of ROM (Read Only Memory) type have been illustrated so far in the above-mentioned respective samples, the present invention is not limited to those examples and can be also applied to rewritable optical discs, such as a magneto-optical recording disc and a phase-change recording disc. When the AgCu alloy thin film comprising the information recording layer of the present invention is applied to the reflective film or the heat structure film, the weather resistance can be improved and the amount in which the recording density is changed due to aged deterioration caused after the optical disc had been stored for a long time can be decreased. As a result, stable recording becomes possible, and the jitter can be effectively avoided from being deteriorated.

For example, the present invention was applied to the magneto-optical recording medium 100 shown in FIG. 3 and change of recording sensitivity was measured.

The magneto-optical recording medium 100 comprises the substrate 101 on which there are laminated the first dielectric layer 41 made of $SiN_x$ having a film thickness of 40 [nm], the recording layer 42 made of TbFeCo having a film thickness of 15[nm], the heat adjustment film 43 formed of the translucent reflective film made of AgCu containing alloy having a film thickness of approximately 10[nm], the second dielectric layer 44 made of $SiN_x$ having a film thickness of approximately 20[nm] and the reflective film 45 made of AgCu containing alloy having a film thickness of approximately 40[nm], in that order.

We had manufactured magneto-optical disk samples in which the heat adjustment film 43 and the reflective film 45 were formed of $AgPd_{0.9}Cu_{1.5}$ alloy thin films and magneto-optical disks formed of $AgCu_{0.9}Ti_{1.7}$ alloy thin films.

In this case, a mark length of 0.3 [μm] was recorded on the magneto-optical recording layer 104 deposited on the substrate 101 in which recording guide grooves, formed of so-called lands and grooves, having a track pitch of 0.80 [μm] and a groove depth of 30[nm] were formed under respective conditions in which a wavelength of laser light was selected to be 405[nm], a numerical aperture of an objective lens was selected to be 0.60 and a linear velocity was selected to be 4.6[m/s] by a method called magnetic field modulation recording, and we had measured relationships between recording power and CNRs of reproduced signals obtained before and after the above-mentioned storage test.

FIG. 5 shows measured results. In FIG. 5, solid squares and open squares show measured results obtained before and after the storage tests had been effected on the magneto-optical disks in which $AgPd_{0.9}Cu_{1.5}$ alloy thin films were deposited, and solid circles and open circles show measured results obtained before and after the storage tests had been effected on the magneto-optical disks in which $AgCu_{0.9}Ti_{1.7}$ alloy thin films were deposited.

As shown in FIG. 5, in the magneto-optical disks in which the $AgPd_{0.9}Cu_{1.5}$ alloy thin films were deposited, recording power obtained after the storage test under high temperature and high humidity conditions was shifted in the increasing direction of approximately 10%. That is, after the magneto-optical disks had been left under high temperature and high humidity conditions, atoms in the deposited thin film are caused to move to increase density of the thin film with the result that thermal conductivity increases and energy loss increases.

On the other hand, in the magneto-optical disk in which the $AgCu_{0.9}Ti_{1.7}$ alloy thin film in the magneto-optical disk according to the example of the optical recording medium of the present invention was deposited, after the storage test under high temperature and high humidity conditions, it is to be understood that recording power is not increased, energy loss is small and that the film characteristic is extremely excellent in weather resistance.

In general, thermal conductivity of metal material may increase in the metal material having higher reflectance, and conversely, thermal conductivity of metal material may decrease as its reflectance may decrease. Moreover, recording density may decrease as thermal conductivity of metal material may increase. Stated otherwise, recording density may increase as thermal conductivity may decrease.

It is possible to estimate changes of recording sensitivity by measuring the amounts in which reflectances of the reflective film were changed before and after the storage test. Therefore, from the respective inventive examples shown on [table 1] to [table 5], it is possible to estimate the changes of recording sensitivity in various compositions.

Although the present invention is characterized in that AgCu alloy or AgCuPd alloy contain more than one kind of any one of Al, Ti, Fe, Ni, Mo, W, it is to be expected that the above-mentioned alloy can contain V, Cr, Mn, Co, Y, Zr, Nb, Ru, Ta which are transition metals having similar chemical nature in addition to such added chemical elements with similar effects to those of the present invention being achieved.

The optical recording medium according to the present invention is not limited to the optical recording mediums having information recording layers of single layer and two layers and the present invention can similarly be applied to optical recording mediums having multilayer structures in which information recording layers of more than three layers, for example, are laminated to one another.

Further, while the substrate comprising the optical recording medium is formed by injection molding in the above-mentioned examples, the present invention is not limited to the above-mentioned examples and can also be applied to the case of an optical recording medium in which very small indentations are formed on a plate having a smooth surface by 2P (Photo polimerization).

Furthermore, while the examples of the disc-like and disk-shaped optical recording mediums have been described so far in the above-mentioned examples, the present invention is not limited to those examples and can be applied to optical recording mediums of various shapes such as a card-like optical recording medium and a sheet-like optical recording medium as well.

DESCRIPTION OF REFERENCE NUMERALS 1 first substrate
2 second substrate
3 transparent adhesive layer
10 optical recording medium
11 first very small indentations
12 second very small indentations
13 translucent reflective film
14 reflective film
21 first information recording layer
22 second information recording layer
41 first dielectric layer
42 recording layer
43 heat adjustment film
44 second dielectric layer
45 reflective film
100 optical recording medium
101 substrate
102 very small indentations
104 magneto-optical recording layer
105 information layer
106 protective film
200 optical recording medium
201 first substrate
202 second substrate
203 transparent adhesive layer
211 first very small indentations
222 second very small indentations
223 translucent reflective film
224 reflective film
231 first information recording layer
232 second information recording layer

What is claimed is:

1. In an optical recording medium including at least an information recording layer and a reflective film, an optical recording medium characterized in that said reflective film is made of an AgCu containing alloy containing Cu the content of which is greater than or equal to 2.0 [atomic %] and less than or equal to 9.0 [atomic %] and said AgCu containing alloy is made of an AgCu containing either of ternary alloy and quaternary alloy containing one or two chemical elements of Fe, Ni, Mo, W and whose total content of said chemical elements is greater than or equal to 0.5 [atomic %] and less than or equal to 8.1 [atomic %].

2. In an optical recording medium in which at least a first information recording layer and a second information recording layer are laminated to each other, an optical recording medium characterized in that said first information recording layer has a translucent reflective film formed thereon, said second information recording layer has a reflective film formed thereon, said translucent reflective layer is made of an AgCu containing alloy containing Cu the content of which is greater than or equal to 2.0[atomic %] and less than or equal to 9.0[atomic %], said AgCu containing alloy is made of an AgCu containing either of ternary alloy and quaternary alloy containing one or two chemical elements of Fe, Ni, Mo, W and whose total content of said chemical elements is greater than or equal to 0.5[atomic %] and less than or equal to 8.1[atomic %] and information is reproduced from said second information recording layer with irradiation of light that has passed through said first information recording layer.

3. In an optical recording medium including at least an information recording layer and a reflective film, an optical recording medium characterized in that said reflective film is formed of an AgCuPd containing alloy thin film containing Cu the content of which is greater than or equal to 1.5 atomic % and less than or equal to 9.0 atomic % and Pd the content of which is greater than or equal to 0.1 atomic % and less than or equal to 2.0 atomic % said AgCu containing alloy is made of an AgCuPd containing either of quatemary alloy and quinary alloy containing one or two chemical elements of Al, Ti, Fe, Ni, Mo, W and whose total content of said chemical elements is greater than or equal to 0.5 atomic % and less than or equal to 8.1 atomic %.

4. In an optical recording medium in which at least a first information recording layer and a second information recording layer are laminated to each other, an optical recording medium characterized in that said first information recording layer has a translucent reflective film formed thereon, said second information recording layer has a reflective film formed thereon, said translucent reflective film is made of an AgCuPD containing alloy containing Cu the content of which is greater than or equal to 1.5 atomic % and less than or equal to 9.0 atomic %, and Pd the content of which is greater than or equal to 0.1 atomic % and less than or equal to 2.0 atomic % said AgCuPd containing alloy is made of an AgCuPd containing either of quatemary alloy and quinary alloy containing one or two chemical elements of Al, Ti, Fe, Ni, Mo, W and whose total content of said chemical elements is greater than or equal to 0.5 atomic % and less than or equal to 8.1 atomic % and information is reproduced from said second information recording layer with irradiation of light that has passed through said first information recording layer.

5. An optical recording medium according to claim 2, or 3, wherein said first information recording layer is formed on a first substrate molded by transparent material, said second information recording layer is formed on a second substrate, said first and second substrates are laminated to each other through a transparent adhesive agent layer in such a manner that information recording layers thereof are facing to each other and information is reproduced from said first and second information recording layers with irradiation of light from said first substrate side.

* * * * *